Dec. 30, 1947.    G. C. WILSON    2,433,412
APPARATUS FOR FORMING MOLDED BODIES ON ARTICLES
Filed July 30, 1943    3 Sheets-Sheet 1

Dec. 30, 1947.    G. C. WILSON    2,433,412
APPARATUS FOR FORMING MOLDED BODIES ON ARTICLES
Filed July 30, 1943    3 Sheets-Sheet 2

Dec. 30, 1947. G. C. WILSON 2,433,412
APPARATUS FOR FORMING MOLDED BODIES ON ARTICLES
Filed July 30, 1943 3 Sheets-Sheet 3

Patented Dec. 30, 1947

2,433,412

UNITED STATES PATENT OFFICE 2,433,412

APPARATUS FOR FORMING MOLDED BODIES ON ARTICLES

Gardiner C. Wilson, Lancaster Township, Lancaster County, Pa., assignor to Armstrong Cork Company, Lancaster, Pa., a corporation of Pennsylvania Application July 30, 1943, Serial No. 496,728

8 Claims. (Cl. 18—36)

1

This invention relates to apparatus for molding or shaping nosings on projectiles and, more particularly, to a method and apparatus for forming and shaping a nosing concentrically about the ogival portion of a projectile.

Various attempts have been made to form nosings about the ogival portions of projectiles. Such attempts were unsuccessful and unsatisfactory for it was well-nigh impossible to mold the nosing concentrically about the ogival portion of the projectile which is essential to render the projectile useful. It was difficult, if not impossible, to terminate the nosing at the required line about the ogival portion of the projectile; thus, an additional hand-finishing operation was required to properly shape the nosing, greatly increasing the cost of the operation. Due to the difficulties in molding, if this hand-finishing operation was not performed, in many cases the finished projectile did not fit satisfactorily in the ordnance.

The chief object of my invention is to provide apparatus for molding nosings about projectiles which eliminates the disadvantages and deficiencies of the apparatus heretofore used for this purpose. An object of my invention is to provide apparatus for molding nosings on projectiles which is economical and practicable and can be practiced readily and quickly using the hydraulic molding presses available in the industry. A further object is to provide molding members capable of insertion in the usual hydraulic molding presses which operate efficiently and effectively to mold nosings concentrically of the ogival portions of projectiles. A still further object is to provide molding members designed to pinch off a nosing at a desired line about the ogival portion of a projectile thus obviating further shaping operations or tumbling operations to remove flash. Other objects of my invention will be readily perceived from the following description of my invention.

This invention relates to a molding device comprising, in combination, a mold member having a mold cavity adapted to mold a nosing concentrically of the ogival portion of a projectile, a positioning member adapted to hold the base of the projectile in aligned position with said mold member, and an intermediate member adapted to be disposed in position about the upper portion of the projectile, said intermediate member having an opening adapted to receive the mold member and being so shaped as to pinch off the molded nosing at a desired line about the ogival portion of the projectile.

2

The attached drawings illustrate a preformed embodiment of my invention, in which Figure 1 is a sectional view through the mold members of my invention, illustrating the mold in closed position;

Figure 1:
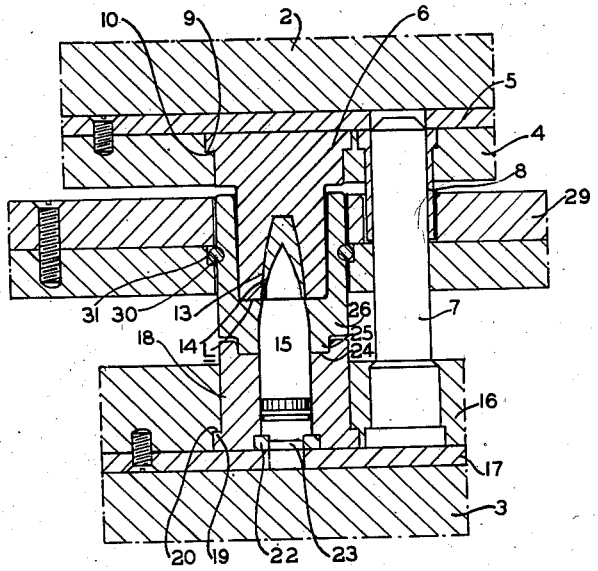
Figure 2:
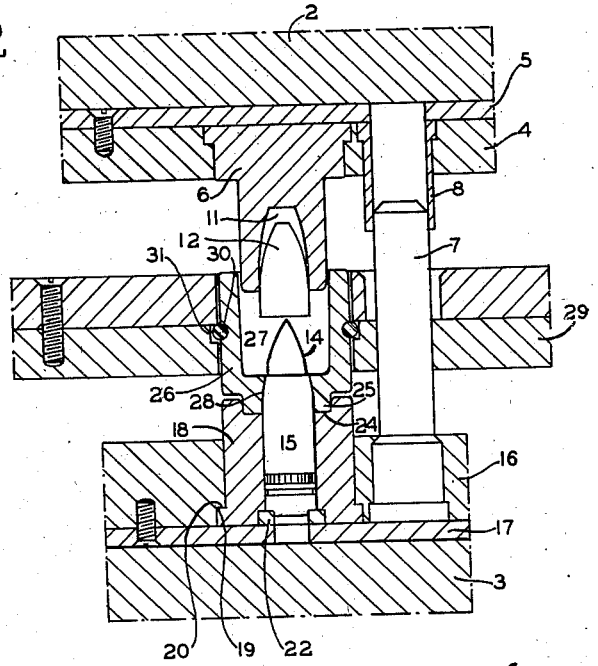
Figure 2 is a sectional view similar to Figure 1 illustrating the mold in partially opened position prior to the molding operation.

Referring to the drawing, there is shown in Figures 1 and 2 a sectional view of a hydraulic molding press including mold members of my invention. The hydraulic press per se is the ordinary type customarily employed in the industry and is not shown in detail. Such press consists of two platens 2 and 3, either or both being movable toward one another and actuating means therefor. In the embodiment illustrated herein, the lower platen 3 is movable toward the upper platen 2 while platen 2 remains stationary throughout the operation of the device.

For ease of description, I will describe my invention primarily with reference to a single mold station but it will be understood as many mold stations may be provided as desired, such stations being similar in all respects and a plurality of mold stations are contemplated by my invention. A plate 4 with its backing plate 5 is mounted on the upper platen 2 and such plate is provided with an opening to receive an upper mold member 6 which may be heated by any suitable means. Likewise, plate 4 is provided with an opening to receive a guide pin 7 to assure alignment with the mold members on the lower platen 3. A bushing 8 is secured about the opening in plate 4 to receive the pin 7. Mold member 6 is held in plate 4 by means of a projection 9 which rests on a shoulder 10 surrounding the mold member receiving opening. Member 6 contains a mold cavity 11, Figure 2, adapted to shape moldable composition 12, preferably used as a preform, to form a nosing 13 about the ogival portion 14 of a projectile 15. Suitable pin means hereinafter described may be provided to eject the molded nosing 13 from the molding device. The moldable composition 12 may be any of the thermo-setting or thermoplastic resins customarily employed and preferably is any of the phenol-aldehyde resin molding compounds readily available on the market. The ogival portion 14 of the projectile 15 may be provided with undercuts to form concentric rings, etched, or etched and dipped in a suitable adhesive to assure adhesion of the molded nosing to the projectile.

The lower platen 3 supports a plate 16 which is backed by plate 17, both being secured to platen 3; plate 16 is provided with openings to receive a lower positioning member 18 and the guide pin 7. A projection 19 on the member 18 engages a shoulder 20 surrounding the plate opening to retain member 18 in the plate opening. Member 18 is provided with an opening adapted to receive the projectile 15. Within the opening and resting on plate 17 is an annular pad 22 supporting or forming a seat for the projectile 15. The pad 22 is provided with an opening 23 to permit any flash falling within the opening in member 18 to be removed. Member 18 disposes the base of the projectile 15 in predetermined position. On its upper surface, member 18 is provided with a depression 24 adapted to form an interlocking joint with a projecting portion 25 of an intermediate member 26 disposed between members 18 and 6, as hereinafter described.

The member 26 is adapted to locate or position the upper portion of the projectile and has an opening 27 shaped to receive the member 6. Extending through the base of the member 26 is a second opening 28 through which the upper portion of the projectile 15 extends so that when the mold is closed, the ogival portion 14 of the projectile extends within the cavity 11 of the upper member 6. The member 26 is floatably supported by a two-part plate 29 slidably mounted in the press so as to be capable of vertical movement on the guide pins 7. The member 26 has an opening extending circumferentially of its exterior surface in which is disposed a locking ring 30. Ring 30 extends within a cavity 31 in the lower part of plate 29 so that the member 26 is thus supported by plate 29. Such means of support permits slight movement of member 26 so that it is readily aligned with members 6 and 18 to hold the projectile in proper position thus assuring that the nosing is molded concentrically of the projectile. The opening 27 has its wall at a slight inclination from a vertical plane to assure the member 6 entering therein but the lower portion of the wall is shaped to fit the member 6 within very close limits.

It will be noted, refer to Figure 1, the member 26 is so designed as to have a very close fit about the bourrelet diameter of the projectile. Thus, in the molding operation, the composition is restrained from flow along the projectile beyond a desired line, serving, in effect, to "pinch off" the composition at the desired line about the nosing, that is, at the horizontal line L where the leading edge of mold element 6 engages the bottom of the cavity in intermediate element 26. If a slight excess of molding composition be present in the mold, substantially all of it flows between the members 6 and 26 as flash and is easily removed or broken off when the projectile is removed after the molding operation is completed. Such construction obviates a hand-finishing operation necessary to clean off hardened molding composition from those portions of the projectile where it is undesirable and in fact deleterious.

I will now describe the method of operation of the apparatus described above. A projectile 15 is placed with the lower member 18 on the pad 22, the member 18 surrounding the lower portion or base of the projectile holding it in a vertical position. The press is then partially closed in order to engage members 18 and 26 with their associated mechanisms, the depression 24 of member 18 receiving the projection 25 of member 26; this interlocking construction permits member 18 to adjust member 26, permitted by its floating fit in plate 29, to dispose the upper portion of the projectile in required position. The press is then stopped and a plate (not shown) having pins carrying preforms is placed over plate 29; the press is then closed sufficiently to wedge or force the preforms 12 into the cavities 11 as shown in Figure 2. The press is then opened sufficiently to permit the pin-carrying plate to be removed therefrom. In Figure 2, the press is illustrated in its lowered position after the pin-carrying plate has been removed. The press is then closed. Upon closing of the press, the lower member 18 continues its rise and the plate 29 is also raised by the lower platen 3 since member 26 engages the lower member 18. The upper member 6 fits into the opening 27 in member 26. If there be a slight discrepancy in alignment, such fit readjusts member 26 to hold the ogival portion of the projectile in position to permit the nosing to be molded concentrically thereabout. As the press closes, the application of heat and pressure to the preform forces it to conform to the contour of the cavity 11 and to flow about the ogival portion 14 of the projectile, being pinched off along the desired line about the ogival portion as described above. By the proper positioning of the members as described, the nosing 13 of desired contour is molded concentrically about the ogival portion 14 of the projectile 15.

Figure 3:
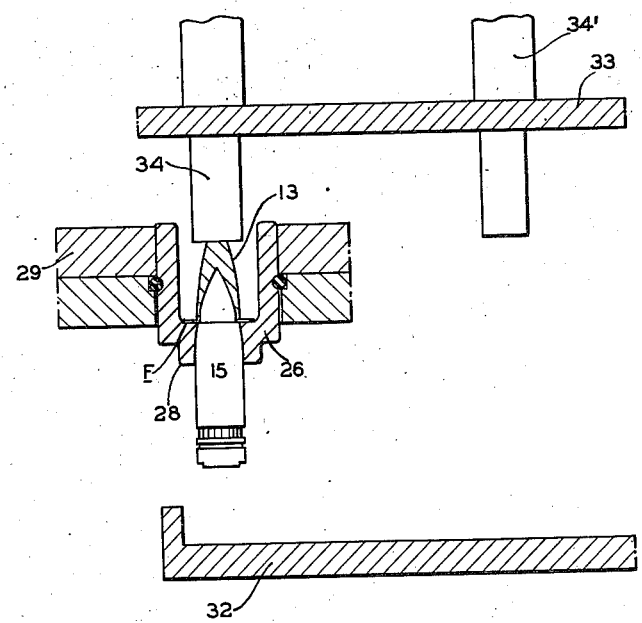
Figure 3 is an exaggerated sectional view illustrating means for ejecting completed articles from the device.

The mold is then opened, the members 18 and 26 being retracted from member 6. Projectile 15 carrying the molded nosing 13 is held in member 26. A receptacle 32 (refer to Figure 3) is placed on plate 16 (not shown in Figure 3) to receive the projectiles; a movable pin plate 33 carrying pins 34 is disposed over plate 29. Pins 34' forming part of the usual knock-out mechanism (not shown) common to the art and actuated so as to move with platen 3 move plate 33 downwardly to eject the molded article from member 26. Thus, as platen 3 continues its downward movement, plate 33 moves downwardly therewith, bringing pins 34 in contact with the molded nosing 13. As downward movement of the pins continues, they eject the projectiles 15 from members 26, breaking off any flash F which may have been created between members 26 and 6 by the downward movement of the projectiles through the openings 28. Projectiles carrying adhered nosings fall into receptacle 32 which is then removed from the press. Any desired means, of course, may be used to eject or release the molded part. The means described and illustrated are preferred since use of such means does not form a slight rim on the top of the nosing.

It will be noted, refer to Figure 2, that the diameter of the cavity 11 at the surface of member 6 is slightly less, about 0.005", than the diameter of the opening 28. This is highly desirable for it permits ejection of the molded part through opening 28 without danger of "scuffing" or otherwise marring the finish of the molded part.

Figure 4:
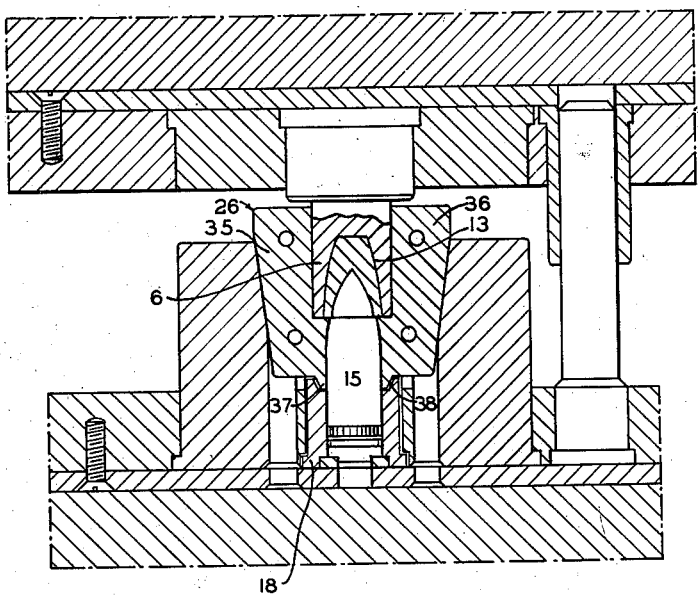
Figure 4 is a sectional view of a modified form of my invention, the mold being shown in closed position.
Figure 5:
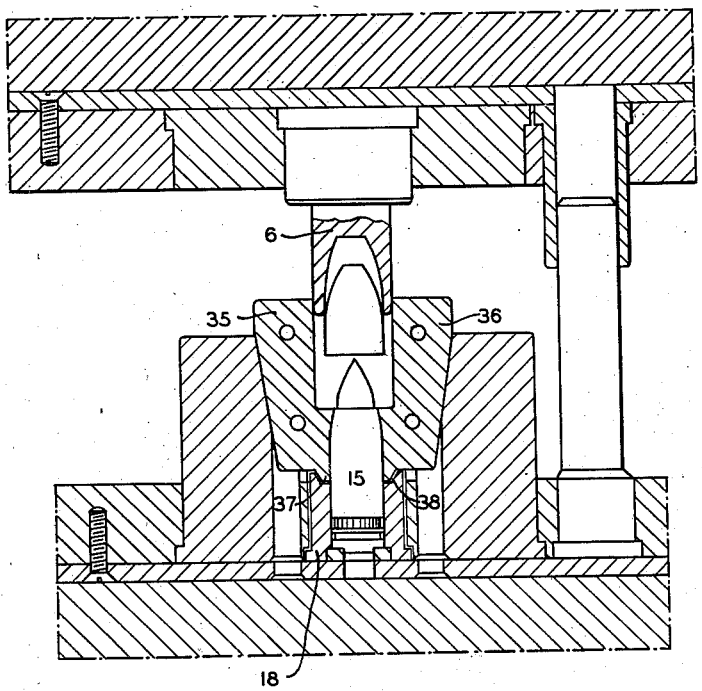
Figure 5 is a sectional view similar to Figure 4, illustrating the mold in partially opened position.

In Figures 4 and 5, a different design of nosing 13 is molded in which there is a larger diameter at the straight section of the nosing where it meets the projectile than the diameter of the projectile itself. This design of nosing obviously could not be molded by the members shown above for it would become locked in the members and could not be ejected. I have designed the intermediate member 26 in this modification of my invention to embody a split construction although, essentially, it is similar to and operates in the same manner as the member illustrated in Figures 1 and 2.

The intermediate member 26 is composed of the two split mold sections 35 and 36. Such sections 35 and 36 are aligned with member 18 by a tapered engaging fit between a projection 37 provided at the bottom thereof with a tapered recess 38 in the member 18. In this case, member 18 is so disposed as to permit it to move slightly in a horizontal direction in order to exactly align the lower portion of the projectile 15 with the upper portion retained in the intermediate member 26. Likewise, the member 6 is also capable of slight horizontal movement. When the mold is closed, the horizontally immovable split member 26 aligns the upper and lower members 6 and 18 and assures precise positioning of the projectile to enable a nosing to be molded concentrically about its ogival portion.

My invention provides many advantages. It assures that the nosing is molded concentrically about the ogival portion of the projectile and substantially eliminates flow of plastic composition beyond the desired point of the projectile. It permits the operation to be conducted efficiently and speedily and reduces considerably the cost of the final product. An additional advantage resides in its ability to make use of available equipment for production of material thus obviating delays caused by unavailability of new equipment for this purpose.

While I have described and illustrated preferred embodiments of my invention, it will be understood my invention is not limited thereto since it may be otherwise embodied within the scope of the following claims.

I claim:

1. In a molding device, the combination of an upper mold member having a mold cavity, said member being adapted to mold a nosing concentrically of the ogival portion of a projectile, a seat for the projectile, a lower positioning member surrounding said seat adapted to hold the base of the projectile in alignment with the cavity in said mold member, an intermediate member having an opening through which the upper portion of the projectile extends and an opening on the opposite side thereof adapted to receive the mold member to permit the projectile to extend within the mold cavity, and a plate floatably supporting said intermediate member so as to assure proper positioning thereof by engagement with the upper and lower members to permit the nosing to be molded concentrically about the ogival portion of the projectile, said intermediate member being so shaped as to pinch off the molded nosing at a desired line about the ogival portion of the projectile.

2. In a molding device, the combination of an upper mold member having a mold cavity, said member being adapted to mold a nosing concentrically of the ogival portion of a projectile, a seat for the projectile having an opening for the escape of flash created in the molding operation, a lower positioning member surrounding said seat adapted to hold the base of the projectile in alignment with the cavity in the mold member, an intermediate member adapted to engage said lower member to be properly disposed about the upper portion of the projectile, said intermediate member having an opening through which the upper portion of the projectile extends and an opening in the opposite side thereof adapted to receive the mold member to permit the projectile to extend within the mold cavity when the mold is closed, a plate surrounding said intermediate member, a ring disposed about said intermediate member and extending into an opening in said plate so as to floatably support said member from said plate, said intermediate member being aligned by engagement with the upper and lower members to hold the ogival portion of the projectile in proper position for molding the nosing concentrically thereabout, said intermediate member being so shaped as to pinch off the molded nosing at a desired line about the ogival portion of the projectile.

3. In a molding device, the combination of a mold member having a mold cavity adapted to form a molded body concentrically of an article having a substantially cylindrical body, a positioning member adapted to hold the base of the article in alignment with the mold member, an intermediate member interengageable with the positioning member and with the mold member and adapted to be disposed about the upper portion of the article, and a surface portion of said intermediate member positioned to firmly engage the article to pinch off the flow of molding composition from the body along the surface of said article beyond the line of engagement between said article and said intermediate member.

4. In a molding device, the combination of a mold member having a mold cavity adapted to form a molded body concentrically of an article having a substantially cylindrical body, a positioning member adapted to hold the base of the article in alignment with the mold member, an intermediate member interengageable with the positioning member and with the mold member and adapted to be disposed about the upper portion of the article, a surface portion of said intermediate member positioned to firmly engage the article to pinch off the flow of molding composition from the body along the surface of said article beyond the line of engagement between said article and said intermediate member, and means for floatably supporting said intermediate member independently of said mold member and positioning member comprising a plate and a lost motion attaching means connecting the intermediate member to the plate.

5. In a molding device, the combination of an upper member having a mold cavity adapted to mold a nosing concentrically of the ogival portion of a projectile, a lower positioning member adapted to hold the projectile in upright position, an intermediate member interengageable with the positioning member and adapted to be disposed about the upper portion of the projectile, a surface portion of said intermediate member adapted to firmly engage the projectile to pinch off the flow of molding composition from the nosing along the surface of the projectile beyond the line of engagement between said projectile and said intermediate member, a second surface on said intermediate member positioned to engage said mold member to position the same with respect to the projectile received in said intermediate member, and means for floatably supporting said intermediate member independently of said mold member and said positioning member comprising a plate and a lost motion connection joining the intermediate member to the plate.

6. A molding device according to claim 1 in which the intermediate member is formed with a groove in its outer surface, the plate is formed with a groove in its inner surface surrounding said intermediate member, and a ring is disposed in the groove in the intermediate member and extends into the groove in said plate to constitute the sole support for said member when the device is in open position.

7. In a molding device, the combination of a mold member having a mold cavity adapted to form a molded nosing concentrically of the ogival portion of a projectile, an article positioning member adapted to hold the base of the article in alignment with the mold member, and an intermediate member formed in two complementary sections and engageable with the positioning member and with the mold member and adapted to be disposed in clamped relationship about the upper portion of the article, a surface portion of said intermediate member positioned to firmly engage the article to pinch off the flow of molding composition from the nosing along the surface of said article beyond the line of engagement between said article and said intermediate member, and complementary tapered surfaces on the intermediate member and the supporting member for bringing said half sections into firm clamping engagement about the article and for maintaining the same in firm engagement during the molding operation.

8. In a molding device, the combination of a mold member having a mold cavity for forming a molded body on an article; a positioning member adapted to receive said article and hold it in alignment with said mold member; and means intermediate said mold member and said positioning member interengageable with said members and positioned to be disposed about a portion of the article received in said positioning member and having a surface portion positioned to firmly engage the article to pinch off the flow of molding composition from the body along the surface of said article beyond the line of engagement between said article and said intermediate means.

GARDINER C. WILSON.

REFERENCES CITED

The following references are of record in the file of this patent:

UNITED STATES PATENTS

| Number | Name | Date |
|---|---|---|
| 2,388,356 | Humphrey | June 30, 1942 |
| 135,415 | Estabrook | Feb. 4, 1873 |
| 2,028,592 | Crowley | Jan. 21, 1936 |
| 1,589,913 | Wells | June 22, 1936 |
| 2,222,755 | Watson | Nov. 26, 1940 |
| 2,047,043 | Strickland | July 7, 1936 |
| 1,355,254 | Parsons | Oct. 12, 1920 |
| 1,936,775 | Stedman | Nov. 28, 1933 |
| 2,135,570 | Ellis | Nov. 8, 1938 |
| 222,229 | Beals et al. | Dec. 2, 1879 |
| 479,354 | Dickinson | July 19, 1892 |
| 2,256,769 | Amrine | Sept. 23, 1941 |
| 2,131,319 | Greenholtz et al. | Sept. 27, 1938 |
| 2,158,044 | Haller | May 9, 1939 |
| 2,261,916 | Megow et al. | Nov. 4, 1941 |